(12) United States Patent
Fries

(10) Patent No.: US 7,434,218 B2
(45) Date of Patent: Oct. 7, 2008

(54) ARCHIVING DATA IN A VIRTUAL APPLICATION ENVIRONMENT

(75) Inventor: Robert M Fries, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 179 days.

(21) Appl. No.: 11/205,590

(22) Filed: Aug. 15, 2005

(65) Prior Publication Data

US 2007/0038998 A1 Feb. 15, 2007

(51) Int. Cl.
G06F 9/455 (2006.01)
G06F 9/46 (2006.01)
G06F 12/00 (2006.01)
G06F 9/45 (2006.01)

(52) U.S. Cl. .......................... 718/1; 718/100; 707/200; 707/204; 717/100

(58) Field of Classification Search ...... 718/1, 718/100–104; 707/2, 204, 200; 711/161–162; 709/222; 719/328; 717/100
See application file for complete search history.

(56) References Cited

U.S. PATENT DOCUMENTS

| | | | | |
|---|---|---|---|---|
| 5,206,951 A * | 4/1993 | Khoyi et al. | ................. | 719/315 |
| 5,896,531 A * | 4/1999 | Curtis et al. | ................. | 718/104 |
| 6,105,074 A * | 8/2000 | Yokote | ......................... | 719/328 |
| 6,463,535 B1 * | 10/2002 | Drews | .......................... | 713/176 |
| 6,633,892 B1 * | 10/2003 | Chan et al. | ................... | 707/204 |
| 6,725,373 B2 * | 4/2004 | Carbajal et al. | .............. | 713/179 |
| 6,748,591 B1 * | 6/2004 | Lewallen | ...................... | 717/170 |
| 6,766,353 B1 * | 7/2004 | Lin et al. | ..................... | 709/203 |
| 7,028,305 B2 * | 4/2006 | Schaefer | ....................... | 719/310 |
| 7,069,554 B1 * | 6/2006 | Stammers et al. | ............ | 717/178 |
| 7,093,086 B1 * | 8/2006 | van Rietschote | ............. | 711/161 |
| 7,107,463 B2 * | 9/2006 | England et al. | .............. | 713/193 |
| 7,127,526 B1 * | 10/2006 | Duncan et al. | ............... | 709/249 |
| 7,137,004 B2 * | 11/2006 | England et al. | .............. | 713/176 |
| 7,191,440 B2 * | 3/2007 | Cota-Robles et al. | ........... | 718/1 |
| 7,257,707 B2 * | 8/2007 | England et al. | .............. | 713/164 |
| 7,305,553 B2 * | 12/2007 | England et al. | .............. | 713/164 |
| 7,337,310 B2 * | 2/2008 | Cheston et al. | ................. | 713/1 |
| 7,373,451 B2 * | 5/2008 | Lam et al. | ........................ | 711/6 |
| 2005/0076326 A1 * | 4/2005 | McMillan et al. | ............ | 717/100 |
| 2005/0125513 A1 * | 6/2005 | Sin-Ling Lam et al. | ...... | 709/220 |
| 2005/0267920 A1 * | 12/2005 | Helliker et al. | ............... | 707/204 |
| 2005/0278278 A1 * | 12/2005 | Petev et al. | ...................... | 707/1 |
| 2006/0080521 A1 * | 4/2006 | Barr et al. | ........................ | 713/2 |

(Continued)

OTHER PUBLICATIONS

"Microsoft Virtual Server 2005," *Microsoft Corporation*, © 2005.

(Continued)

*Primary Examiner*—Thomas Lee
*Assistant Examiner*—Jennifer N To
(74) *Attorney, Agent, or Firm*—Woodcock Washburn LLP

(57) ABSTRACT

A computer system suitable for archiving data with a corresponding application program in a virtual application environment is presented. The computer system includes a processor, a memory, and a storage. The computer system also includes an operating system, data to be archived, and an application program that correspond to the data, such that the application program can operate on the data. The computer system also includes a virtual application environment generator. In response to an instruction to archive the data, the virtual application environment generator generates a virtual application environment. The virtual application environment comprises the data, the corresponding application program, and the operating system.

16 Claims, 4 Drawing Sheets

U.S. PATENT DOCUMENTS

2006/0085625 A1* 4/2006 Cheston et al. ............ 713/1
2006/0155674 A1* 7/2006 Traut et al. ................ 707/2
2006/0155735 A1 7/2006 Traut
2006/0184653 A1* 8/2006 van Riel ................ 709/222
2006/0184937 A1 8/2006 Abels

OTHER PUBLICATIONS

"What is Virtual Infrastructure?" *VMware, Inc.*, © 2005.
"What is VMware VirtualCenter?" *VMware, Inc.*, © 2005.

* cited by examiner

ARCHIVING DATA IN A VIRTUAL APPLICATION ENVIRONMENT

BACKGROUND OF THE INVENTION

Losing data is an unfortunate reality for many computer users. Data can be lost under a variety of conditions and circumstances. Hardware failure, malicious or accidental deletion are common culprits for data loss. To compensate or protect oneself against loss in these circumstances, many computer users wisely create duplicate, backup copies of important data and/or programs.

Unfortunately, there are also many ways in which data may become lost irrespective of whether a valid backup copy of the data has been made and is available. In particular, over time the programs, the operating systems, and/or the hardware become no longer available. When this occurs, a computer user cannot access critical data, even when an otherwise viable backup copy of that data exists.

For example, data may be stored by a proprietary database and then archived. At some time later, when that data is needed, the proprietary database program (or the operating system that supports that database program, or the hardware upon which that operating system runs) is no longer available or in use. Thus, even though the database has been maintained as a valid archive, the contents of the database are inaccessible.

There are, of course, niche markets that specialize in retrieving data created by and/or stored on archaic computer systems or software. Their techniques vary widely. One technique is to maintain old computer hardware, operating systems, and software. Another, widely divergent technique involves "cracking open" the data stored by proprietary systems, extracting it using sophisticated software techniques and expertise. In all cases, there is a substantial expense for retrieving data that has been archived but whose corresponding programs, operating systems, or hardware is no longer readily available.

SUMMARY OF THE INVENTION

According to aspects of the present invention, a computer system suitable for archiving data with a corresponding application program in a virtual application environment is presented. The computer system includes a processor, a memory, and a storage. The computer system also includes an operating system, data to be archived, and an application program that correspond to the data, such that the application program can operate on the data. The computer system also includes a virtual application environment generator. An example of a virtual application environment generator is Microsoft Corporation's Virtual Server Migration Tool. In response to an instruction to archive the data, the virtual application environment generator generates a virtual application environment. The virtual application environment comprises the data, the corresponding application program, and the operating system.

According to additional aspect of the present invention, a computer-readable medium bearing computer-executable instructions is presented. When executed on a computer system, the computer-executable instructions carry out a method for archiving data in a virtual application environment. The method comprises receiving a request to archive the data. A virtual application environment is then generated. The virtual application environment includes the data, an application program suitable for operating on the data, and an operating system suitable for supporting the execution of the application program. The virtual application environment is the stored in storage.

According to yet further aspects of the present invention, a method for archiving data in a virtual application environment is presented. The method comprises receiving a request to archive data. A virtual application environment is then generated. The virtual application environment includes the data, an application program suitable for operating on the data, and an operating system suitable for supporting the execution of application program. The virtual application environment is the verified to determine whether it is suitable for execution on a virtual machine corresponding to a computer system upon which the operating system and the application program can function. If the virtual application environment is suitable for execution on the virtual machine, the virtual application environment is then stored in a storage.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
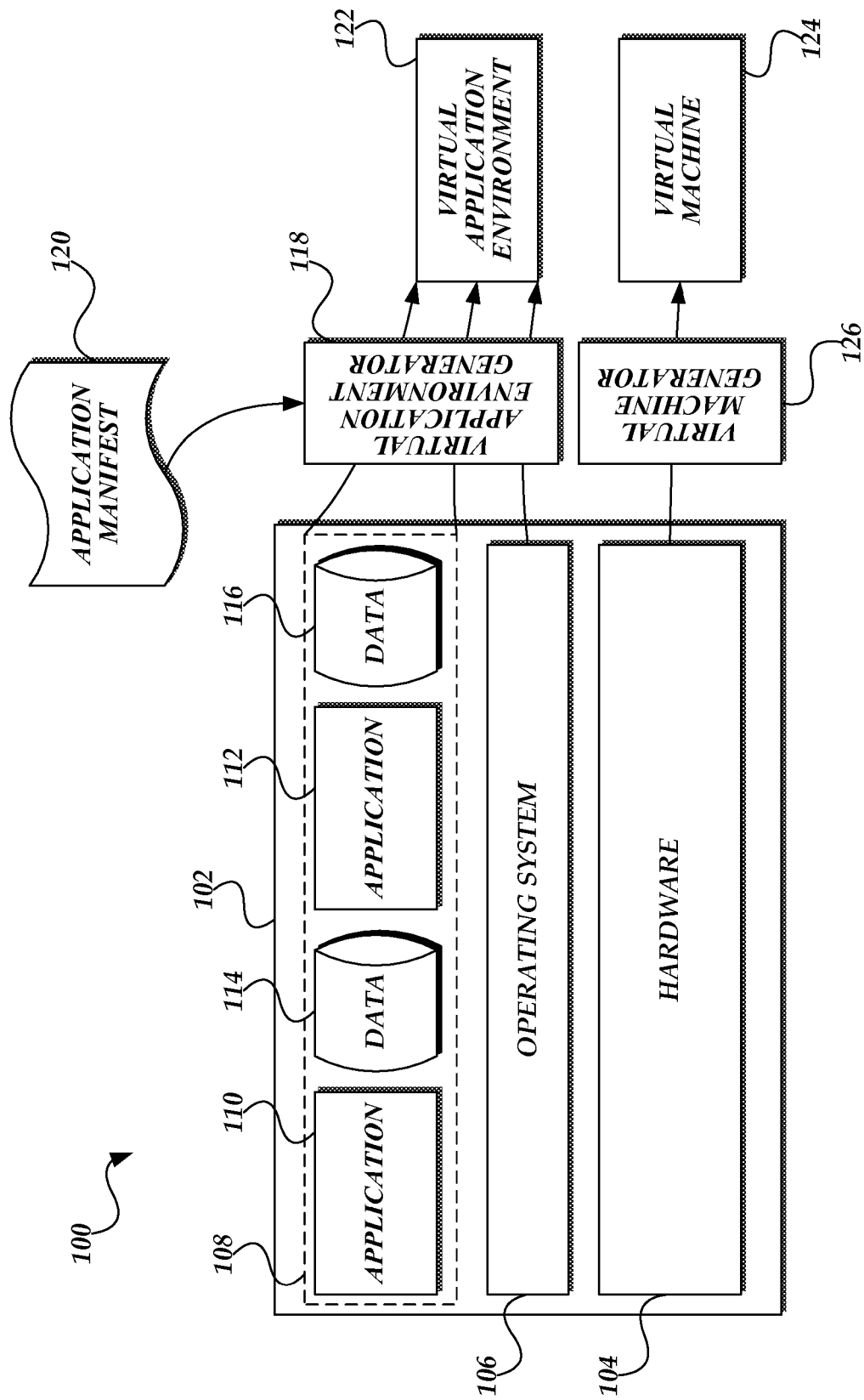
FIG. 1 is a block diagram illustrating an exemplary operating environment suitable for implementing aspects of the present invention.

FIG. 1 is a block diagram illustrating an exemplary operating environment 100 suitable for implementing aspects of the present invention. The exemplary operating environment 100 includes a computer system 102, shown in FIG. 1 in logical layers for illustration purposes. In particular, the exemplary computer system 102 includes a hardware layer 104, an operating system layer 106, and an application layer 108.

The hardware layer 104 includes components such as the processor, memory, mass storage (such as hard drives, optical drives, and the like), graphics display subsystems, and the like. The operating system layer 106, as the name suggests, includes the operating system which supports the application layer 108. This layer also typically includes configuration settings, including user preferences and program settings for application programs in the application layer. The application layer 108 includes software programs and/or services such as application programs 110 and 112, as well as the supporting files, user created data (114 and 116), and the like.

While FIG. 1 illustrates the applications 110 and 112 as single modules, those skilled in the art will appreciate that almost all application programs are typically not monolithic bodies of code. Instead, application programs are typically comprised of various components, including code modules, text modules, data files, resources, configuration files, and the like. Thus, the illustration of application programs 110 and 112 (and others throughout the following discussion) as single component entities should be viewed as a logical construct for illustration purposes, and should not be viewed as limiting upon the present invention.

In addition to application program components, as a product of using most application programs, users typically create data files 114 and 116. In fact, such data files are typically what is most important to the user. More particularly, the application program, if corrupted or deleted from a computer system, can typically be restored from the media with which the user was provided when the application program was purchased. However, the data files created by the application programs, such as data files 114 and 116, are the product of user interactions and creations, and as such, are unique and should be preserved against accidental, malicious, or inadvertent loss.

According to aspects of the present invention, in order to preserve the data files such that they can be used at a future time when the application program, operating system, and/or hardware is no longer available or useable, the data files are archived in a virtual application environment 122 which can be stored on media such as optical disks, hard drives, or other backup services such as online storage. The virtual application environment 122 includes the operating system and application programs necessary to operate on the co-archived data files.

According to aspects of the present invention, the virtual application environment 122 is generated such that it can be executed on a virtual machine. As those skilled in the art will appreciate, a virtual machine is an abstraction of computer hardware, implemented in software, that can then be executed on other computer hardware. Generating and using virtual machine technology is known in the art. For example, Microsoft Corporation's Virtual Server Migration Tool is one example of a product that generates a virtual machine. As shown in FIG. 1, the virtual machine 124 is generated by a virtual machine generator 126. While not Shown, the virtual machine 124 may be stored on any number of backup or storage targets including, but not limited to, magnetic tape, hard disk storage, optical media, and the like.

By generating the virtual application environment to run on a virtual machine, such as virtual machine 124, it is no longer necessary to maintain the computer hardware 104 in order to access the data generated by obsolete application programs. Thus, after years have passed and the hardware, the operating system, and the application programs are no longer commercially available, the archived data, such as data file 114 or 116, is still accessible. Using the virtual machine technology, implementing a virtual machine 124 corresponding to the hardware from which the virtual application environment 122 was generated, the data is accessible on virtually any computer hardware running any operating system.

In order to ensure that the virtual application environment 122 can later be executed, in one embodiment, the virtual application environment includes information identifying the virtual machine platform, i.e., the corresponding computer hardware from which the virtual application environment was generated.

The virtual application environment 122 is created using a virtual application environment generator 118 that converts the data files, the application program or programs, an the operating system into the virtual application environment 122. In particular, virtual application environment generator 118 determines which components (especially with regard to a particular application program) need to be included in the virtual application environment 122 such that the application program corresponding to the subject matter data file can operate.

According to one embodiment, the virtual application environment generator 118 includes all application programs and the operating system on the computer system 102 into the virtual application environment 122, thereby ensuring that all components of the application program corresponding to the subject matter data file are included. Alternatively, the virtual application environment generator 118 uses an application manifest 120 that identifies the components of an application program that should be included in the virtual application environment 122. Of course, other information may also be used to determine the components of an application program, such as installation manifests, operating system registry information, and the like.

In at least one embodiment of the present invention, the virtual application environment 122 is generated such that it operates as a bootable device. In other words, the virtual application environment 122 can function as the boot device of actual computer hardware, or of a virtual machine.

Figure 2:
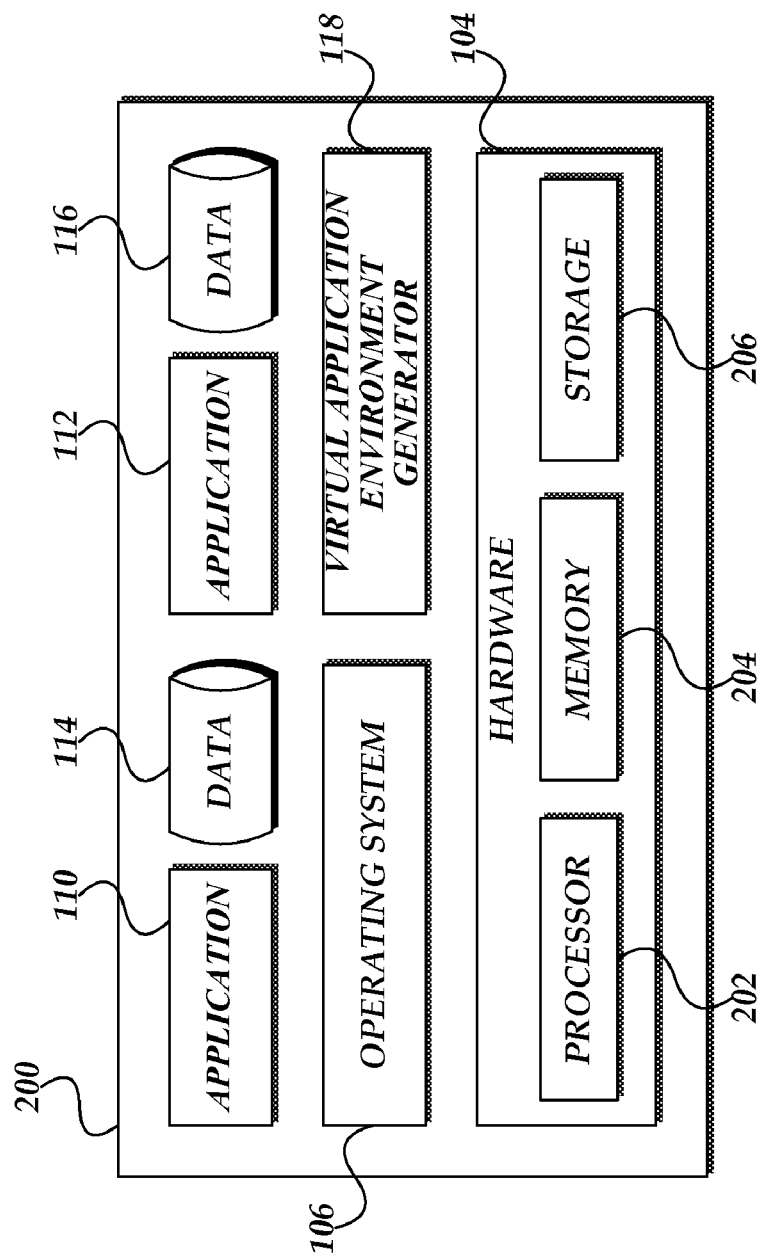
FIG. 2 is a block diagram illustrating an exemplary computer system suitable for archiving data into a virtual application environment.

FIG. 2 is a block diagram illustrating an exemplary computer system 200 suitable for archiving data into a virtual application environment 122. In particular, the computer system 200 includes computer hardware 104, an operating system 106, one or more application programs 110 and 112, as well as corresponding data files 114 and 116. As shown in FIG. 2, the computer hardware includes a processor 202, a memory 204, and a storage 206. Of course, as those skilled in the art will appreciate, these hardware components are illustrative of the many components that make up the computer hardware, and should not be viewed as limiting upon the present invention.

The exemplary computer system 200 also includes a virtual application environment generator 118. As indicated above, the virtual application environment generator 118 combines the data file, such as data file 114, with its corresponding application program and the operating system operating on the computer hardware 104, into a virtual application environment 122 (FIG. 1). However, it should be appreciated that while the virtual application environment generator 118 is illustrated as residing upon the exemplary computer system 200, in an alternative embodiment, the virtual application environment generator is on an external computer system, and configured to operated remotely on the exemplary computer system 202.

Figure 3:
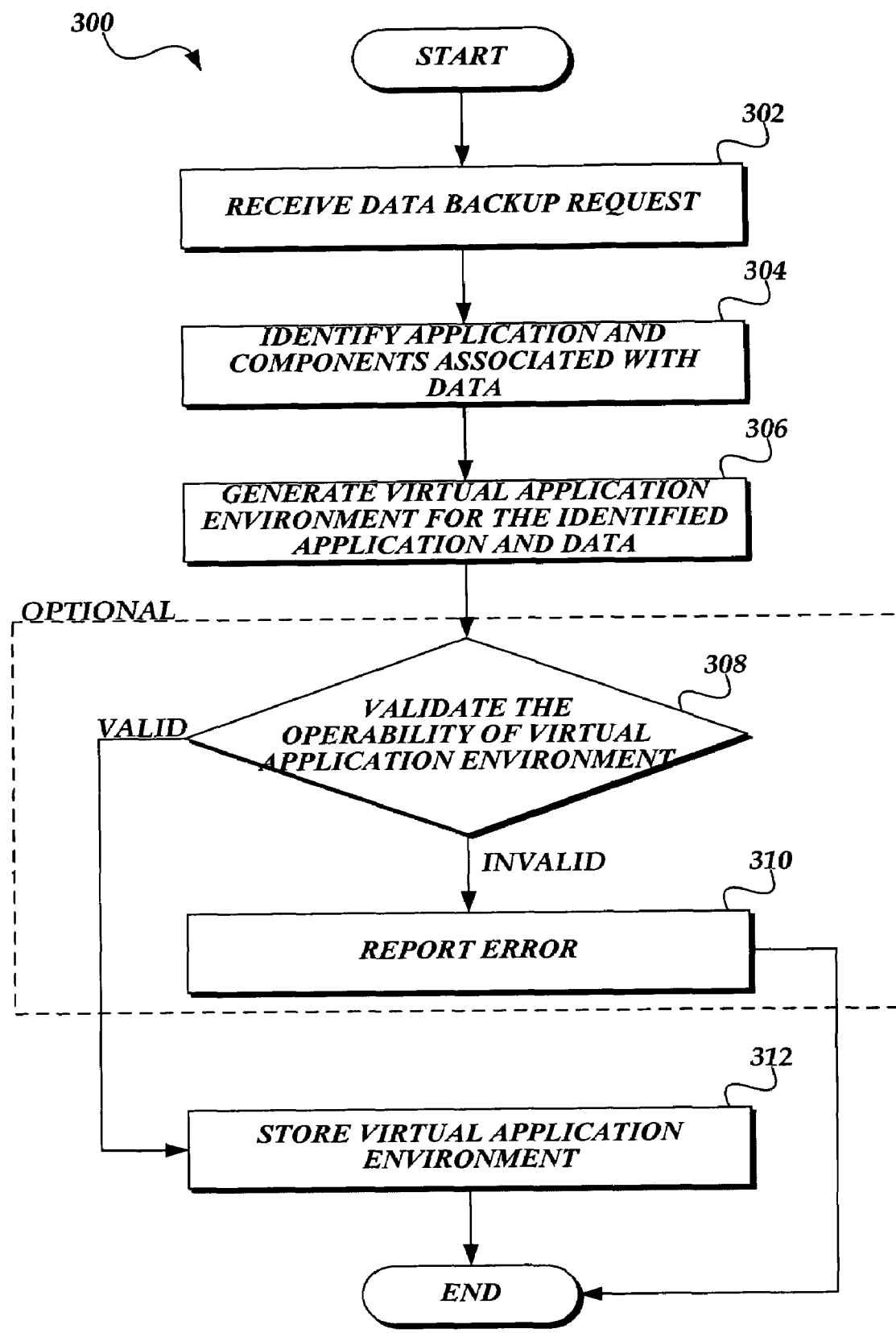
FIG. 3 is a flow diagram illustrating an exemplary routine for archiving data according to aspects of the present invention.

FIG. 3 is a flow diagram illustrating an exemplary routine 300 for archiving data in a virtual application environment 122 according to aspects of the present invention. Beginning at block 302, a request to archive a data file is received. At block 304, the application program (or programs) associated with the data file, its components and associated files, are identified. As discussed above, the application program's components may be identified using an application manifest 120, using computer system settings such as registry entries, using installation manifests, and the like.

In an alternative embodiment, a request to archive a volume may be received. As those skilled in the art will appreciate, a volume may include any number of data files, some of which created by disparate application programs. Thus, similar to the logic described above, an exemplary routine would identify, for each data file in the volume to be archived, the corresponding application program (or programs) for inclusion in the virtual application environment 122.

At block 306, the virtual application environment 122, including the identified application program components, the data file, and an operating system capable of operating the application program is generated. The virtual application environment 122 may also include information identifying the virtual machine or actual computer hardware upon which the virtual application environment can execute.

At decision block 308, the virtual application environment 122 is optionally validated to determine whether it can be executed on a virtual machine corresponding to the computer hardware from which the components of the virtual application environment were generated. If the virtual application environment 122 proves invalid, at block 310 an error is reported, and thereafter the routine 300 terminates.

If the virtual application environment 122 is properly validated, at block 312, the virtual application environment is stored. Thereafter, the routine terminates.

It should be appreciated that while the above description of routine 300 treats the data file as a single object, in fact the data to be archived may comprise a plurality of files and components, and the present invention should not be construed as limited to archiving a single data file in the virtual application environment 122.

Figure 4:
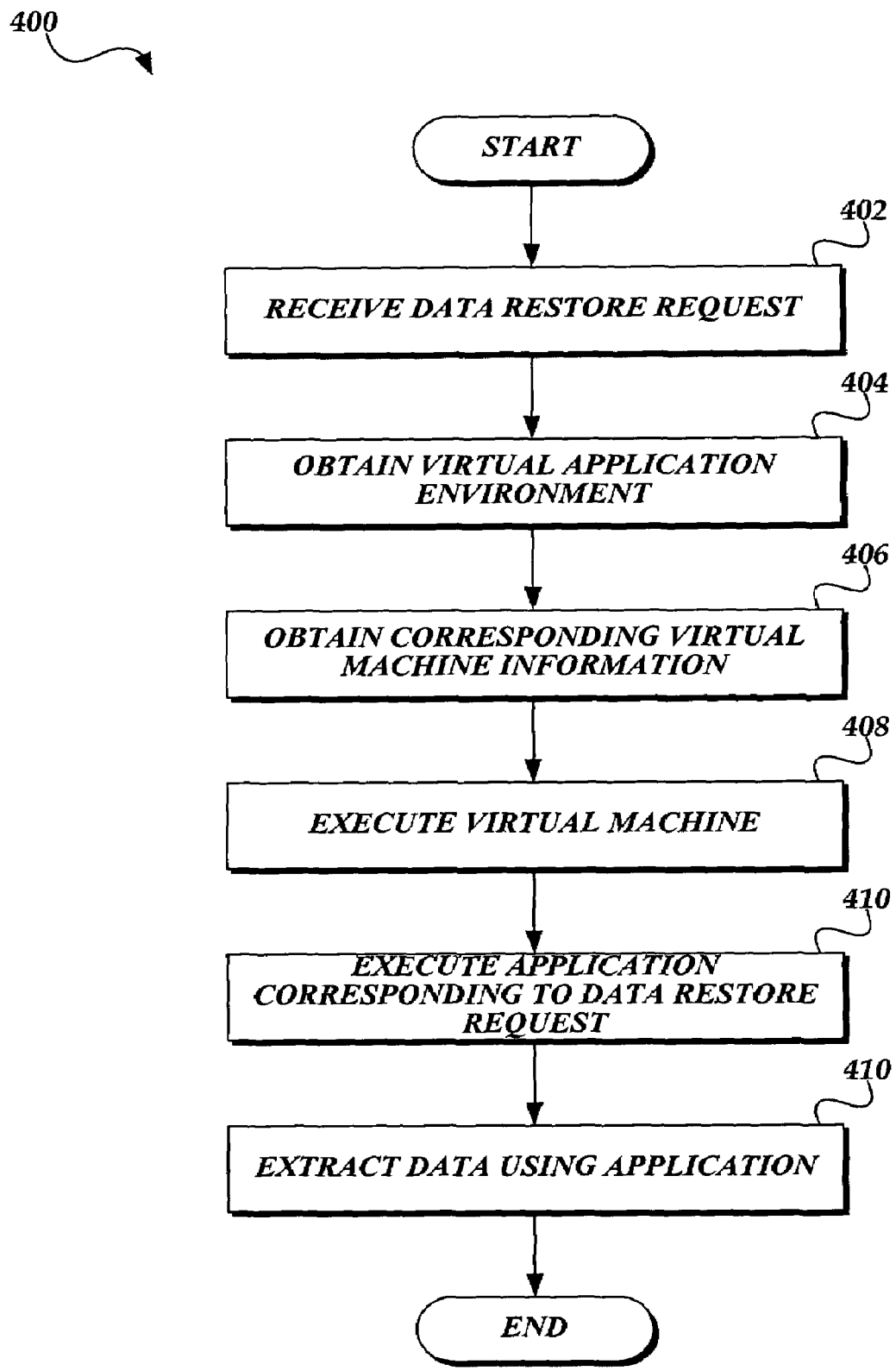
FIG. 4 is a flow diagram illustrating an exemplary routine for retrieving archived data from an virtual application environment.

FIG. 4 is a flow diagram illustrating an exemplary routine 400 for retrieving archived data from a virtual application environment 122. Beginning at block 402, a request to restore data from a virtual application environment 122 is received. At block 404, the virtual application environment 122 is obtained.

At block 406, information regarding the virtual machine 124 corresponding to and necessary to support the virtual application environment 122 is obtained. At block 408, the virtual machine 124 corresponding to virtual application environment 122 is executed (if it is not already executing). Of course, as discussed earlier, the virtual application environment 122 may be executed on a virtual machine 124, or alternatively, on computer hardware (not shown) corresponding to the original computer hardware on which the virtual application environment 122 was generated.

Executing the virtual application environment 122 may involve booting the virtual application environment upon the virtual machine. In such cased, the virtual application environment 122 should be configured to operate as a bootable device.

Once the virtual application environment 122 is executing, at block 410, the application program corresponding to the data file which is to be retrieved is executed. At block 412, the data is extracted using the corresponding application program, either in an automated manner, or at the direction of a computer user. Thereafter, the routine 400 terminates.

While the preferred embodiment of the invention has been illustrated and described, it will be appreciated that various changes can be made therein without departing from the spirit and scope of the invention.

The invention claimed is:

1. A computer system for archiving user-created data in a virtual application environment, the computer system comprising a processor, a memory, a storage, an operating system, user-created data to be archived, and a plurality of application programs including at least one application program suitable for operating on the user-created data, and wherein the computer system further comprises:
a virtual application environment generator in response to an instruction to archive the user-created data, the virtual application environment generator is configured to:
identify which of the plurality of application programs is suitable for operating on the user-created data according to an application installation manifest corresponding to the identified program;
generate a virtual application environment comprising the user-created data, the identified application program, and the operating system;
verify whether the virtual application environment is suitable for execution on a virtual machine corresponding to a computer system upon which the operating system and the identified application program can function; and
store the virtual application environment in the storage if the virtual application environment is suitable for execution on the virtual machine.

2. The computer system of claim 1, wherein the virtual application environment is generated to operate on a virtual machine corresponding to the computer system.

3. The computer system of claim 2, wherein the virtual application environment is further generated to operate as a bootable device on a virtual machine corresponding to the computer system.

4. The computer system of claim 2, wherein the virtual application environment includes in formation that identifies the virtual machine upon which the virtual application environment can operate.

5. The computer system of claim 1, wherein the virtual application environment is generated to include all of the application programs from the computer system, including the identified application program suitable for operating on the user-created data.

6. The computer system of claim 1, wherein the virtual application environment generator generates the virtual application environment such that only the corresponding application program of the plurality of application programs is included with the operating system and user-created data.

7. The computer system of claim 1, wherein the identified application program suitable for operating on the user-created data comprises a plurality of components distributed on the computer system, and where the virtual application environment generator identifies the components of the identified application program and includes them as the identified application program in the virtual application environment.

8. A computer-readable medium bearing computer-executable instructions which, when executed on a computer system, carry out a method for archiving user-created data in a virtual application environment, the method comprising:
receiving a request to archive user-created data;
determining which of a plurality of application programs is suitable for operating on the user-created data according to an application installation manifest corresponding to the identified application program;
generating a virtual application environment comprising user-created data, the determined application program suitable for operating on the user0created data, and an operating system suitable for supporting the execution of the determined application program;
verifying whether the virtual application environment is suitable for execution on a virtual machine corresponding to a computer system upon which the operating system and the determined application program can function; and
storing the virtual application environment in a storage medium.

9. The computer-readable medium of claim 8, wherein the virtual application environment is generated for execution on a virtual machine corresponding to the computer system.

10. The computer-readable medium of claim 9, wherein the virtual application environment is further generated to operate as a bootable device when executed on a virtual machine corresponding to the computer system.

11. The computer-readable medium of claim 10, wherein the virtual application environment is further generated to include information for identifying the virtual machine upon which the virtual application environment may be executed.

12. The computer-readable medium of claim 8, wherein the virtual application environment is generated to include a plurality of application programs installed on the computer system including the determined application program suitable for operating on the user-created data.

13. A method for archiving user-created data in a virtual application environment, the method comprising:
receiving a request to archive user-created data;
identifying an application program of a plurality of application programs suitable for operating on the user-created data according to the application installation manifest corresponding to the plurality of identified application programs;
generating a virtual application environment comprising the user-created data, the identified application program suitable for operating in the user-created data, and an operating system suitable for supporting the execution of the identified application program;
verifying whether the virtual application environment is suitable for execution on a virtual machine corresponding to a computer system upon which the operating system and the identified application program can function; and storing the virtual application environment in the storage if the virtual application environment is suitable for execution on the virtual machine.

14. The method of claim 13, wherein the virtual application environment is further generated to operate as a bootable device when executed on a virtual machine corresponding to the computer system.

15. The method of claim 14, wherein identifying an application program of a plurality of application programs is suitable for operating on the user-created data comprises identifying an application program of a plurality of application programs is suitable for operating on the user-created data according to operating system registry information.

16. The method of claim 13 wherein the user-created data to be archived comprises a plurality of user-created data files corresponding to at least two distinct application programs, and wherein the method further comprises for each user-created data file in the user-created data to be archived, identifying an application program suitable for operating on the user-created data file, and wherein generating the virtual application environment further comprises generating the virtual application environment to include the identified application programs suitable for operating on each user-created data file in the user-created data to be archived.

* * * * *